Sept. 6, 1938.       C. H. BEACH       2,129,557
DETACHABLE TRACTION LUG
Filed June 9, 1937
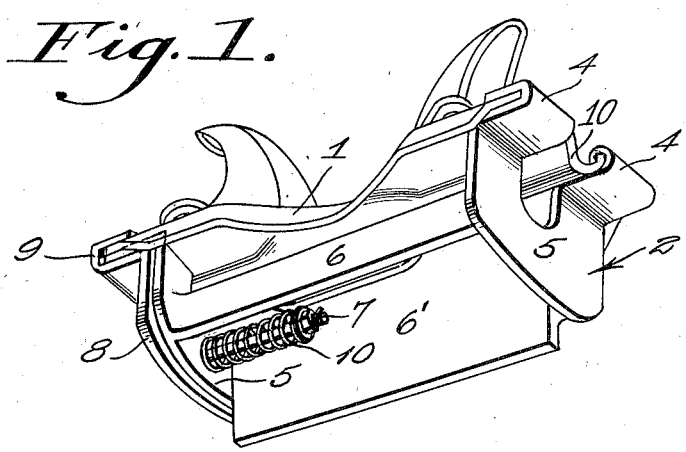
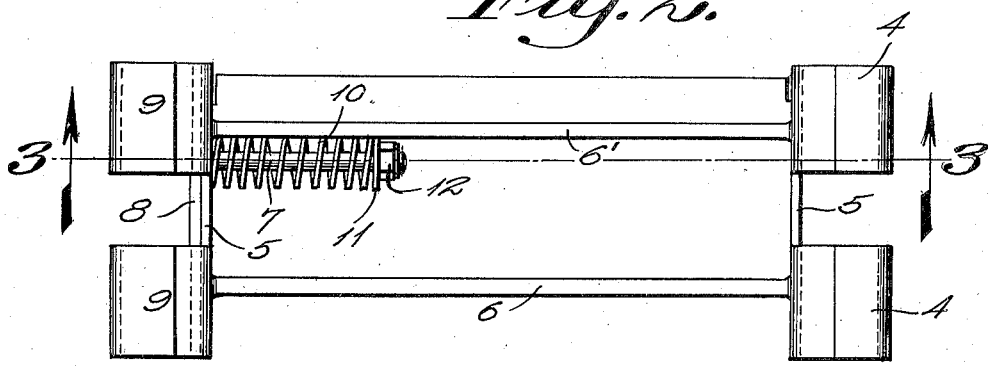
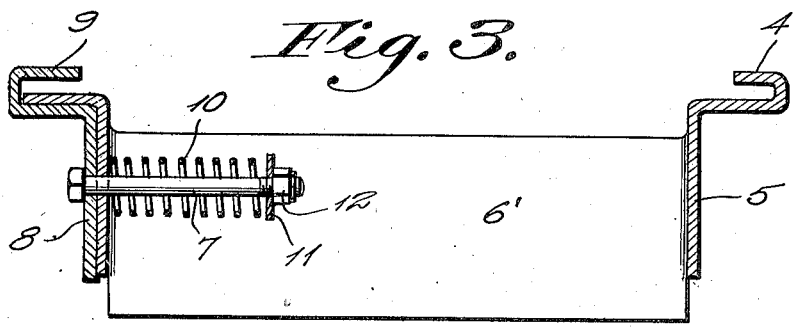
Chas. H. Beach
INVENTOR
BY Victor J. Evans & Co.
ATTORNEYS
WITNESS Patented Sept. 6, 1938

2,129,557

UNITED STATES PATENT OFFICE 2,129,557

DETACHABLE TRACTION LUG

Charles H. Beach, Norcross, Minn.

Application June 9, 1937, Serial No. 147,350

2 Claims. (Cl. 305—10)

This invention relates to traction lugs especially adapted for endless traction belts of the caterpillar type frequently employed for adapting motor vehicles for winter use and has for the primary object the provision of an efficient and inexpensive unit of this character which may be easily applied to a traction belt and with the latter equipped with a number of such units slippage or loss of traction under severe conditions will be entirely eliminated, the construction of each unit being such that its application and removal may be accomplished with ease and quickness and without the use of specially constructed tools.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view showing one of the plates of a traction belt equipped with a traction lug constructed in accordance with my invention.

Figure 2 is a top plan view illustrating the traction lug.

Figure 3 is a sectional view taken on the line 3—3 of Figure 2.

Referring in detail to the drawing, the numeral 1 indicates one of the plates of a traction belt well known in the art for the purpose of converting a motor vehicle for winter travel in snow or mud. To increase the efficiency of a traction belt any number of units 2 may be easily and quickly adapted to selected plates 1 of the traction belt. The unit consists of end plates 5 connected by relatively spaced traction plates 6 and 6', the plate 6' being of a greater width than the plate 6 and is disposed at an angle thereto. One of the end plates 5 has hooks 4 engageable with one end of the plate 1. The plates 5, 6 and 6' are preferably of integral construction and slidably mounted in one of the end plates 5 is a rod 7 secured on a clamping plate 8 which includes hooks 9 to engage over the other end of the plate 1 and cooperate with the hooks 4 in fastening the device on the plate 1. A coil spring 10 is mounted on the rod 7 and bears against one of the end plates 5 and a washer 11 secured on the rod by a nut 12. The spring 10 acts to draw the bracket 8 and its hooks 9 in the direction of the hooks 4 and thereby cause said hooks to cooperate with each other in firmly attaching the unit 2 on the plate 1. The traction plates 6 and 6' thereof will bite into the ground and thereby assure efficient traction for the traction belt which the plate 1 forms a part of. A unit of the character described is simple in construction, economical to manufacture and easy to apply and remove from a traction plate.

The plate 1 of the traction belt is equipped with flanges between which the end plates 5 may fit thereby preventing the unit 2 from creeping endwise of the traction plate. The flanges referred to normally act as traction flanges for the traction belt and form no part of the present invention other than they are employed in preventing the unit from sliding or shifting endwise of the traction belt. The plate 1 also is offset to form a reinforcing rib 10 and the end plates 5 are slotted to receive this rib and the end plates being slotted to receive the rib 10 further aids in preventing shifting of the unit endwise of the traction belt.

The end plates 5 also will bite into the ground and prevent lateral skidding.

Having described the invention, I claim:

1. A traction lug comprising end plates, calk plates integral with the end plates and arranged at right angles thereto and one of said calk plates being of a greater width than the other calk plate and disposed at an inclination thereto, hooks formed on one of the end plates to engage with one end of a traction unit, and a bracket yieldably connected to the other end plate and including hooks to engage with the other end of the traction unit.

2. A traction lug comprising end plates, calk plates integral with the end plates and arranged at right angles thereto and one of said calk plates being of a greater width than the other calk plate and disposed at an inclination thereto, hooks formed on one of the end plates to engage with one end of a traction unit, a bracket paralleling the other end plate, hooks on said bracket to engage with the other end of the traction unit, a rod secured on the bracket and extending freely through the last-named end plate, a washer secured on said rod, and spring means bearing against said washer and the last-named end plate, said end plates having notches to receive an offset of the traction unit.

CHARLES H. BEACH.